United States Patent
Wu et al.

(10) Patent No.: US 10,232,733 B2
(45) Date of Patent: *Mar. 19, 2019

(54) POWER SYSTEM OF ELECTRIC VEHICLE, ELECTRIC VEHICLE COMPRISING THE SAME AND METHOD FOR HEATING BATTERY GROUP OF ELECTRIC VEHICLE

(71) Applicant: BYD COMPANY LIMITED, Shenzhen (CN)

(72) Inventors: Xingchi Wu, Shenzhen (CN); Hongjun Wang, Shenzhen (CN); Shibin Xie, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 174 days.

This patent is subject to a terminal disclaimer.

(21) Appl. No.: 14/403,222

(22) PCT Filed: May 22, 2013

(86) PCT No.: PCT/CN2013/076114
§ 371 (c)(1),
(2) Date: Nov. 24, 2014

(87) PCT Pub. No.: WO2013/174279
PCT Pub. Date: Nov. 28, 2013

(65) Prior Publication Data
US 2015/0104682 A1    Apr. 16, 2015

(30) Foreign Application Priority Data
May 22, 2012  (CN) .......................... 2012 1 0160616

(51) Int. Cl.
*B60L 11/18* (2006.01)
*H01M 10/625* (2014.01)
(Continued)

(52) U.S. Cl.
CPC ....... *B60L 11/1875* (2013.01); *B60L 11/1809* (2013.01); *B60L 11/1838* (2013.01);
(Continued)

(58) Field of Classification Search
CPC .. H01M 10/615; H01M 10/625; H01M 10/63; H01M 10/633; B60L 11/1875;
(Continued)

(56) References Cited

U.S. PATENT DOCUMENTS 2,679,549 A * 5/1954 Rezek ................. H01M 10/615
                                                          219/202
4,090,140 A * 5/1978 Carter .................... H03K 17/52
                                                          327/181
(Continued)

FOREIGN PATENT DOCUMENTS

CN          1599125 A       3/2005
CN        101663187 A       3/2010
(Continued)

OTHER PUBLICATIONS

Machine Translation of Ishikura (JP 2010119171 A).*
English machine translation of Sebastien (WO 2012032271 A1) (Year: 2012).*

*Primary Examiner* — Jonathan G Leong
*Assistant Examiner* — Aaron J Salter
(74) *Attorney, Agent, or Firm* — Anova Law Group, PLLC (57) ABSTRACT

A power system of an electric vehicle, an electric vehicle including the same, and a method for heating a battery group of the electric vehicle are provided. The power system includes: a battery group; a battery heater connected with the battery group; a battery management device, configured to control the battery heater to heat the battery group when a temperature of the battery group is lower than a first heating threshold and a residual electric quantity of the battery group (Continued)

is larger than a running electric quantity threshold, to obtain a current throttle depth change rate of an electric vehicle in real time, and to control the battery heater to stop heating the battery group when the current throttle depth change rate reaches a preset throttle depth change rate threshold; an electric distribution box; a motor; a motor controller; and an isolation inductor.

18 Claims, 6 Drawing Sheets

(51) Int. Cl.
    *H01M 10/615*     (2014.01)
    *H01M 10/633*     (2014.01)
    *H01M 10/63*     (2014.01)

(52) U.S. Cl.
    CPC ....... *B60L 11/1862* (2013.01); *H01M 10/615* (2015.04); *H01M 10/625* (2015.04); *H01M 10/63* (2015.04); *H01M 10/633* (2015.04); *Y02T 10/705* (2013.01); *Y02T 10/7005* (2013.01)

(58) Field of Classification Search
    CPC .............. B60L 11/1809; B60L 11/1838; Y02T 10/7005; Y02T 10/705
    See application file for complete search history.

(56) References Cited

U.S. PATENT DOCUMENTS

| | | | | |
|---|---|---|---|---|
| 5,562,538 A * | 10/1996 | Suyama | ............. | B60H 1/00392 165/267 |
| 5,994,789 A * | 11/1999 | Ochiai | ................ | B60L 11/1803 180/65.1 |
| 2003/0205936 A1 * | 11/2003 | Beckerman | ............... | B60T 1/10 307/10.1 |
| 2005/0196662 A1 | 9/2005 | Prema et al. | | |
| 2006/0091857 A1 * | 5/2006 | Nakanishi | ........... | B60L 11/1851 320/116 |
| 2006/0108956 A1 * | 5/2006 | Clark | ..................... | B60L 3/108 318/139 |
| 2007/0210769 A1 | 9/2007 | Tsutsumi et al. | | |
| 2008/0080192 A1 | 4/2008 | Ruud et al. | | |
| 2008/0217083 A1 * | 9/2008 | Serkh | ....................... | B60K 6/28 180/165 |
| 2008/0280192 A1 | 11/2008 | Drozdz et al. | | |
| 2009/0160247 A1 * | 6/2009 | Nakamura | ............. | B60K 6/445 307/9.1 |
| 2010/0030412 A1 * | 2/2010 | Mitsutani | ................ | B60L 3/003 701/22 |
| 2010/0121513 A1 | 5/2010 | Itoh et al. | | |
| 2010/0191398 A1 * | 7/2010 | Hirota | ................. | B60L 11/1851 701/22 |
| 2010/0244788 A1 * | 9/2010 | Chen | ................... | H02M 3/1584 323/234 |
| 2010/0273080 A1 | 10/2010 | Noguchi et al. | | |
| 2011/0298427 A1 | 12/2011 | Uemura et al. | | |
| 2012/0122000 A1 | 5/2012 | Lee et al. | | |
| 2012/0153929 A1 * | 6/2012 | Yonezawa | ............. | H01L 25/115 323/311 |
| 2012/0203421 A1 * | 8/2012 | Newhouse | .............. | B60R 25/00 701/29.1 |
| 2012/0222438 A1 * | 9/2012 | Osaka | ................ | B60H 1/00271 62/126 |
| 2012/0261397 A1 * | 10/2012 | Schwarz | ............. | B60L 11/1875 219/202 |

FOREIGN PATENT DOCUMENTS

| | | | | | |
|---|---|---|---|---|---|
| CN | 101931110 A | | 12/2010 | | |
| CN | 101931111 A | | 12/2010 | | |
| CN | 102055042 A | | 5/2011 | | |
| CN | 102315502 A | | 1/2012 | | |
| CN | 102416882 A | | 4/2012 | | |
| GB | 2325101 A | * | 11/1998 | .......... | B60L 11/1803 |
| JP | 2000102192 A | | 4/2000 | | |
| JP | 2003102133 A | | 4/2003 | | |
| JP | 2009072003 A | | 4/2009 | | |
| JP | 2010086689 A | | 4/2010 | | |
| JP | 2010119171 A | | 5/2010 | | |
| JP | WO 2011001500 A1 | * | 1/2011 | ............ | H01L 25/115 |
| JP | WO 2011065077 A1 | * | 6/2011 | ......... | B60H 1/00271 |
| JP | 2011151991 A | | 8/2011 | | |
| WO | WO-2012032271 A1 | * | 3/2012 | ............... | B60K 1/04 |

* cited by examiner

FIG. 8 (Amended)

FIG. 9

POWER SYSTEM OF ELECTRIC VEHICLE, ELECTRIC VEHICLE COMPRISING THE SAME AND METHOD FOR HEATING BATTERY GROUP OF ELECTRIC VEHICLE

CROSS-REFERENCE TO RELATED APPLICATION

This application is a national phase entry under 35 U.S.C. § 371 of International Application No. PCT/CN2013/076114, filed on May 22, 2013, which claims the priority to and benefits of Chinese patent application no. 201210160616.6, filed with the State Intellectual Property Office of P. R. C., on May 22, 2012, the entire contents of all of which are incorporated herein by reference.

FIELD OF THE INVENTION

Exemplary embodiments of the present disclosure relate generally to a power system, and more particularly, to a power system of an electric vehicle, an electric vehicle comprising the power system and a method for heating a battery group of the electric vehicle.

BACKGROUND

With the development of the science and technology, new energy vehicles, especially electric vehicles, gradually enter into ordinary families as a means of transportation. The performance requirement, especially the comfort requirement of a user for the vehicle, is higher and higher, which requires that the vehicle must adapt to different operating requirements. But currently most electric vehicles cannot satisfy such requirements. Especially in winter, the temperature is low so that the capability of the battery, no matter the discharge capability or the battery capacity, may be decreased or the battery cannot even be used.

Specifically, the work temperature of the battery especially a lithium ion battery is generally within a range from −20° C. to 55° C., and the battery is not allowed to be charged at a low temperature. Under a low temperature condition, the battery in the electric vehicle may have the following problems: (1) The lithium ions may be deposited easily at the negative electrode and lose the electrical activity at the low temperature, and therefore, if the battery in the electric vehicle is frequently used at the low temperature, the life of the battery may be shortened and a safety problem may be caused accordingly. (2) When the lithium ion battery is charged at the low temperature, the lithium ions may be deposited easily at the negative electrode to become dead ions and thus the capacity of the battery may be decreased. Moreover, the deposited ions grow larger and larger during the continuous use, thus leading to a potential danger such as an internal short circuit. (3) The discharge capability of the battery is limited at the low temperature. All of the problems listed above may be not favorable for the electric vehicle which uses green and environment friendly new energy.

The method for heating a battery is an important technology in the electric vehicle field. A heating strategy of the battery and the performance of the battery heater influence the comfort, operation stability and safety of the vehicle directly. Many new technologies are applied in the battery heating, but because of the self-capability defects, these technologies are not widely applied in the vehicle field. For example, a thermal insulation sleeve is provided to warm a battery by thermal insulation material; an infrared radiation film is used to heat the battery and a thermal insulation sleeve is provided to keep the battery warm; or a heating patch is attached on the surface of the battery. These methods are only suitable for the fixed battery. For a pure electric vehicle, the use of a huge heating system increases the weight of the entire vehicle, thus increasing the energy consumption of the vehicle. Furthermore, using the external power to heat the battery is not suitable for the vehicle which is not fixed in position. Therefore, the above methods have not been widely applied in the electric vehicle field.

BRIEF SUMMARY OF THE DISCLOSURE

According to a first aspect of the present disclosure, a power system of an electric vehicle is provided. The electric vehicle power system comprises: a battery group; a battery heater, connected with the battery group and configured to charge and discharge the battery group to heat the battery group; a battery management device, connected with the battery group and the battery heater respectively, configured to control the battery heater to heat the battery group when a temperature of the battery group is lower than a first heating threshold and a residual electric quantity of the battery group is larger than a running electric quantity threshold, to obtain a current throttle depth change rate of the electric vehicle in real time, and to control the battery heater to stop heating the battery group when the current throttle depth change rate reaches a preset throttle depth change rate threshold; an electric distribution box, configured to distribute a voltage output by the battery group; a motor; a motor controller, connected with the motor and the electric distribution box respectively, comprising a first input terminal, a second input terminal and a pre-charging capacitor connected between the first input terminal and the second input terminal, and configured to supply power to the motor according to a control command and a voltage distributed by the electric distribution box; and an isolation inductor, connected between the battery group and the electric distribution box, wherein an inductance of the isolation inductor matches with a capacitance of the pre-charging capacitor.

With the power system of the electric vehicle according to embodiments of the present disclosure, by using a large current discharge of the battery group in the electric vehicle, the internal resistor of the battery itself may be heated so that the battery group may be heated. Without any external power supply, the electricity for heating is totally supplied by the battery group. A heating management may be performed to the battery group by the battery management device and the battery heater, which may greatly reduce the restriction of using the electric vehicle at the low temperature, thus satisfying the requirements of running and charging at the low temperature. Moreover, the power system heats the battery group directly, and therefore, a higher heating efficiency, a lower cost and a better utility may be obtained.

According to a second aspect of the present disclosure, an electric vehicle comprising the above power system is provided. The electric vehicle can normally run in a cold region and the battery group can be heated while running, thus ensuring a safe and smooth running.

According to a third aspect of the present disclosure, a method for heating a battery group of an electric vehicle is provided, comprising following steps: detecting a temperature and a residual electric quantity of the battery group; if a temperature of the battery group is lower than a first heating threshold and the residual electric quantity of the battery group is larger than a running electric quantity threshold, controlling the battery heater to heat the battery group; obtaining a current throttle depth change rate of the electric vehicle in real time when the battery group is heated; controlling the battery heater to stop heating the battery group when the current throttle depth change rate reaches a preset throttle depth change rate threshold; and if the temperature of the battery group is lower than the first heating threshold and the residual electric quantity of the battery group is lower than the running electric quantity threshold, indicating the battery group is inhibited from being heated or charged and the electric vehicle is inhibited from being driven.

With the method for heating the battery group of the electric vehicle according to embodiments of the present disclosure, the battery group may be heated directly without any external power supply. The temperature of the battery group may be increased to a required temperature and then the battery may be charged or discharged normally, which may greatly reduce the restriction of using the electric vehicle at the low temperature, thus satisfying the requirements of running and charging at the low temperature. Furthermore, by sampling the throttle depth change rate of the electric vehicle and judging whether the output power of the battery group is too high, it is possible to stop heating the battery group when the output power of the battery group is too high, and thus to avoid over-discharge of the battery group. Therefore, a service life of the battery group is prolonged and a dynamic property of the electric vehicle is ensured.

BRIEF DESCRIPTION OF THE DRAWINGS

Having thus described exemplary embodiments of the present disclosure in general terms, reference will now be made to the accompanying drawings, which are not necessarily drawn to scale.

DETAILED DESCRIPTION

Reference will now be made in detail to exemplary embodiments, examples of which are illustrated in the accompanying drawings. It is readily appreciated by those having ordinary skill in the art that the presently claimed subject matter may be embodied in many different forms and should not be construed as limited to the embodiments set forth herein.

In the description, relative terms such as "longitudinal", "lateral", "lower", "upper", "front", "rear", "left", "right", "horizontal", "vertical", "above", "below", "up", "top", "bottom" "external", "internal" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description, terms concerning attachments, coupling and the like, such as "connected" and "interconnected", refer to a relationship in which structures are secured or attached to one another through mechanical or electrical connection, or directly or indirectly through intervening structures, unless expressly described otherwise. Specific implications of the above phraseology and terminology may be understood by those skilled in the art according to specific situations.

Figure 1:
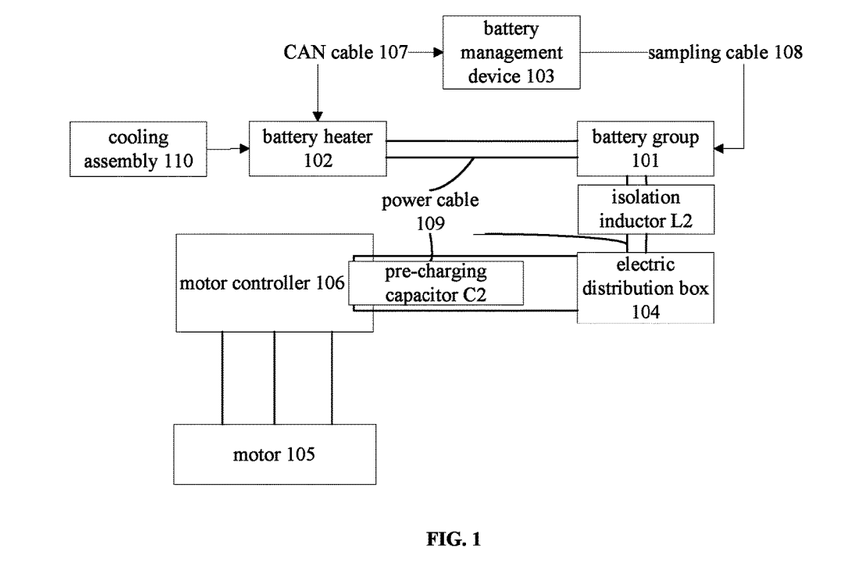
FIG. 1 illustrates a schematic diagram of a power system of an electric vehicle according to an exemplary embodiment.
Figure 2:
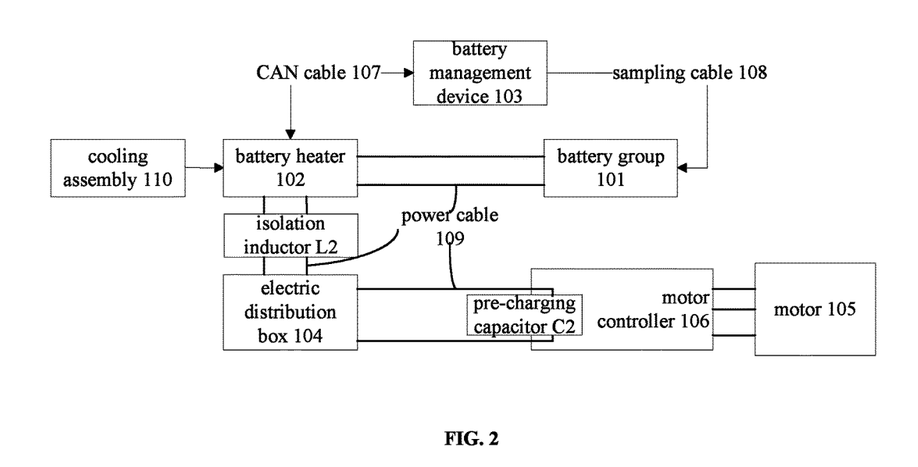
FIG. 2 illustrates a schematic diagram of a power system of an electric vehicle according to an exemplary embodiment.

Referring to FIG. 1 and FIG. 2, the power system of the electric vehicle comprises: a battery group 101, a battery heater 102, a battery management device 103, an electric distribution box 104, a motor 105, a motor controller 106 and an isolation inductor L2. The battery heater 102 is connected with the battery group 101 and configured to charge and discharge the battery group 101 to heat the battery group 101. The battery management device 103 is connected with the battery heater 102 via a CAN (controller area network) cable 107 and connected with the battery group 101 via a sampling cable 108 to sample the temperature and voltage of each battery and the output current of the battery group 101. In addition, the battery management device 103 is also configured to judge the current status of the electric vehicle, to calculate the temperature and the residual electric quantity of the battery group 101, and to send the control signals to relevant electric devices via the CAN cable 107 so as to manage related electric devices.

Specifically, the battery management device 103 is configured to control the battery heater 102 to heat the battery group 101 when a temperature of the battery group 101 is lower than a first heating threshold and a residual electric quantity of the battery group 101 is larger than a running electric quantity threshold, to obtain a current throttle depth change rate of the electric vehicle in real time, and to control the battery heater 102 to stop heating the battery group 101 when the current throttle depth change rate reaches a preset throttle depth change rate threshold. The battery management device 103 is further configured to control the battery heater 102 to continue heating the battery group 103 when the current throttle depth change rate is lower than the preset throttle depth change rate threshold.

It should be understood that, the throttle depth change rate is determined according to a change value of the throttle depth within a certain time period. In other words, a driver determines whether to control the battery heater 102 to heat the battery group 101 according to the change of the throttle depth within a certain time period.

The electric distribution box 104 is a high voltage device for turning on and off the large current. A voltage output by the battery group 101 is distributed by the battery management device 103 by sending a control signal to the electric distribution box 104. The motor controller 106 is connected with the motor 105 and the electric distribute box 104 respectively, and comprises a first input terminal, a second input terminal and a pre-charging capacitor C2 connected between the first input terminal and the second input terminal. The motor controller 106 is configured to supply power to the motor 105 according to a control command and a voltage distributed to the motor controller 106 by the electric distribution box 104. Specifically, the motor controller 106 converts the DC supplied by the battery group 101 into the three-phase AC required by the motor 105 to supply power to the motor 105 by the external driving circuit of the motor controller 106, and controls the motor 105 according to the control signal sent by the battery management device 103. The isolation inductor L2 is connected between the battery group 101 and the electric distribution box 104, and the inductance of the isolation inductor L2 matches with the capacitance of the pre-charging capacitor C2.

A running heating mode means that, besides the battery group 101 being heated by the battery heater 102, other high voltage power consumption equipment of the electric vehicle, such as the motor, an air conditioner, etc., may work simultaneously under a limited power. Accordingly, a parking heating mode means that, except the battery group 101 being heated by the battery heater 102, the other high voltage power consumption equipment of the electric vehicle such as the motor and the air conditioner do not work. Correspondingly, a running electric quantity threshold is a first predetermined residual electric quantity of the battery group when the electric vehicle is allowed to enter the running heating mode, and a parking electric quantity threshold is a second predetermined residual electric quantity of the battery when the electric vehicle is allowed to enter the parking heating mode.

In one embodiment of the present disclosure, the battery heater 102 may be configured to perform a failure self-test and send the test result to the battery management device 103.

Figure 3:
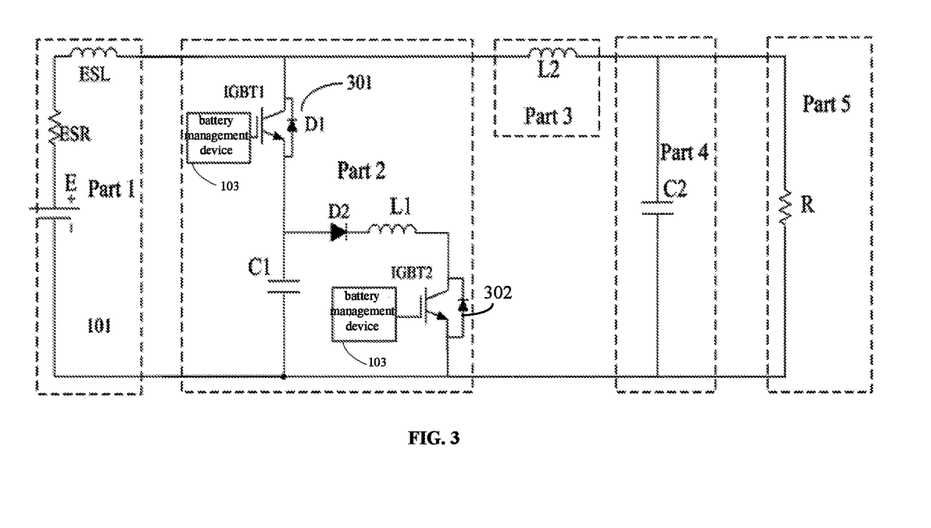
FIG. 3 illustrates an electric principle diagram of a power system of an electric vehicle according to an exemplary embodiment.

Referring to FIG. 3, the battery heater 102 comprises: a first switch module 301, a first capacitor C1, a first inductor L1 and a second switch module 302. A first terminal of the first switch module 301 is connected with a first electrode of the battery group 101 and the isolation inductor L2, respectively. A first terminal of the first capacitor C1 is connected with a second terminal of the first switch module 301, and a second terminal of the first capacitor C1 is connected with a second electrode of the battery group 101. A first terminal of the first inductor L1 is connected with a node between the first switch module 301 and the first capacitor C1. A first terminal of the second switch module 302 is connected with a second terminal of the first inductor L1, and a second terminal of the second switch module 302 is connected with the second electrode of the battery group 101. The control terminal of the first switch module 301 and the control terminal of the second switch module 302 are connected with the battery management device 103. The battery management device 103 sends a heating signal to the control terminal of the first switch module 301 and the control terminal of the second switch module 302 to control the first switch module 301 and the second switch module 302 to turn on in turn so as to generate a charge current and a discharge current in turn. When the first switch module 301 is on, the second switch module 302 is off, and when the second switch module 302 is on, the first switch module 301 is off.

Referring to FIG. 3, the ESR is an equivalent resistor of the battery group 101 (Part 1), the ESL is an equivalent inductor of the battery group 101 (Part 1), and E is a battery package. L2 is an isolation inductor (Part 3) and is configured to isolate the battery heating circuit Part from the motor equivalent load circuit Part 5. Therefore, the reversed voltage of the battery group 101 is absorbed by the isolation inductor L2 and may not be applied to the load follow-up. C2 (Part 4) is a pre-charging capacitor; and R (Part 5) is the equivalent load of the motor. When the battery heater is operational, the internal switch modules thereof turn on or off in a certain timing sequence.

Referring to FIG. 3, according to one embodiment of the present disclosure, the switch module (e.g., the first switch module 301 or the second switch module 302) may be an insulated gate bipolar transistor (IGBT). When the battery heater starts to work, the internal elements of the battery heater, such as inductors, capacitors, are in an initial status and do not store any energy. The operation procedure of the battery heater is described below.

When the IGBT1 is on and the IGBT2 is off, the battery package E charges the first capacitor C1 by the charging loop "E-ESR-ESL-D1-C1-E". After the battery package E has charged the first capacitor C1 for a time period, the voltage of the first capacitor C1 is equal to the voltage of the battery package E. But because there is an inductive element in the battery heater, the first capacitor C1 continues being charged so that the voltage of the first capacitor C1 is higher than that of the battery package. When the charging current is zero, the first capacitor C1 begins to discharge by the discharging loop "C1-D1-ESL-ESR-E-C1" until the discharging current is zero. When the IGBT1 is off and the IGBT2 is on, the first capacitor C1 continues discharging by the discharging loop "C1-D2-L1-IGBT2-C1". Because there is the first inductor L1, the first capacitor C1 continues to discharge so that the voltage of the first capacitor C1 is lower than that of the battery package E. The above process is thus repeated.

In one embodiment of the present disclosure, the isolation inductor L2 may prevent the pre-charging capacitor C2 from charging the first capacitor C1 through the first switch module 301 so that the current waveform of the first capacitor C1 may be controlled and thus the characteristics of the heating circuit may be controlled. Therefore, the circuit may run normally. As a result, when the motor 105 and the battery heater 102 operate simultaneously, the isolation inductor L2 may be needed.

In one embodiment of the present disclosure, the inductance L of the isolation inductor L2 may be determined according to the formula $T=2\pi\sqrt{LC}$, where T is an equivalent load operational period of the motor 105 and C is the capacitance of the pre-charging capacitor C2. The battery heater 102 needs to control the IGBT modules and switch on/off the first switch module 301 or the second switch module 302. Assuming that a switching frequency of the first switch module 301 or the second switch module 302 is t, in order to reduce the influence of the battery heater 102 on the motor controller 106, it may be assumed that a period of a circuit comprising the isolation inductor L2 and the pre-charging capacitor C2 is T. In one embodiment, T>10t, thus meeting the design requirements. Therefore, as used herein, the expression "T is an equivalent load operational period of the motor 105" means that T is the period of the circuit comprising the isolation inductor L2 and the pre-charging capacitor C2.

In one embodiment of the present disclosure, the battery heater 102 further comprises a power connector configured to connect and fasten a power cable 109 (shown in FIG. 1). The power connector needs to satisfy the requirement of the anti-vortex. When the battery heater 102 is operational, the frequency of the current is changed very quickly, which leads to sharp increase in the temperature of the magnetic material in the power connector, so the magnetic permeability of the power connector needs to be low. In one embodiment of the present disclosure, the battery heater 102 further comprises a low voltage connector, which is connected and communicates with an external system. The low voltage connector comprises a CAN cable 107 configured to connect to the battery management device 103, a self-test signal cable and a failure signal cable.

Figure 4:
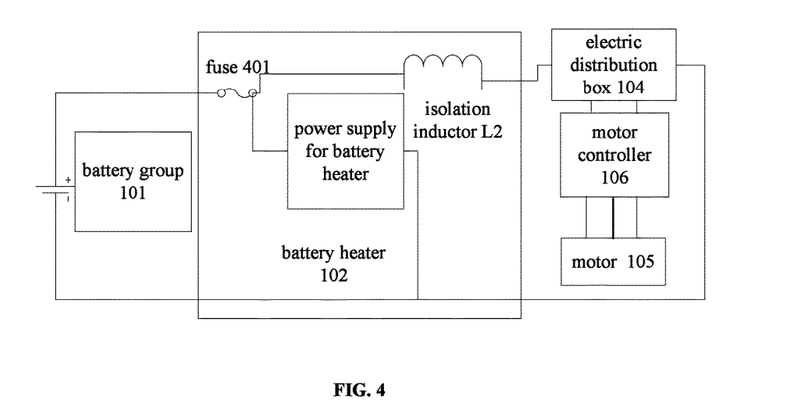
FIG. 4 illustrates an electric connection diagram of a power system of an electric vehicle according to an exemplary embodiment.

Referring to FIG. 2 and FIG. 4, in one embodiment of the present disclosure, the isolation inductor L2 is disposed in the battery heater 102. A fuse 401 is also disposed in the battery heater 102. As shown in FIG. 4, the battery heater 102 comprises the isolation inductor L2, the fuse 401 and a power supply for the battery heater 102. The battery heater 102 further comprises four power connectors, in which two power connectors are connected to the battery group 101 via the power cable 109 and the other two power connectors are connected to the electric distribution box 104 via the power cable 109. In one embodiment of the present disclosure, the power connectors are used in the head end and the tail end of a high voltage cable.

In one embodiment of the present disclosure, the isolation inductor L2 is disposed in the battery heater 102, and when the battery group 101 does not need to be heated, the battery heater 102 may be removed, so that the electric distribution box 104 may be connected directly to the battery group 101. The electric vehicle does not need any battery heater in the high temperature area but needs the battery heater in the low temperature area. Therefore, if the electric vehicle needs to be modified to adapt to different areas, the modification may be small, thus greatly reducing the cost.

Figure 5:
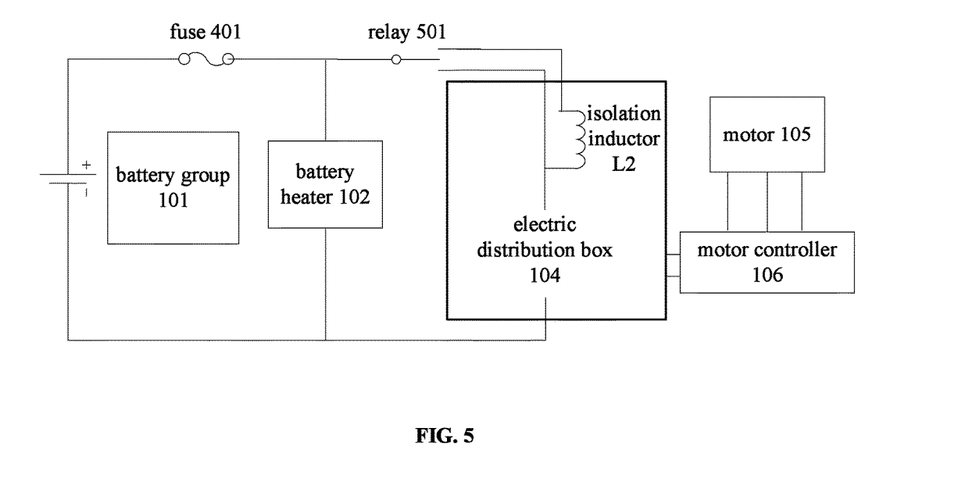
FIG. 5 illustrates an electric connection diagram of a power system of an electric vehicle according to an exemplary embodiment.

Referring to FIG. 1 and FIG. 5, in one embodiment of the present disclosure, the isolation inductor L2 may be disposed in the electric distribution box 104. No matter the isolation inductor L2 is disposed in the battery heater 102 or the electric distribution box 104, the isolation inductor L2 is disposed between the battery group 101 and the electric distribution box 104. Referring to FIG. 1, the electric distribution box 104 is not connected to the battery heater 102 directly. The battery group 101 comprises four power connectors, in which two power connectors are connected to the battery heater 102 via two power cables 109 and the other two power connectors are connected to the electric distribution box 104 via another two power cables 109. In this embodiment, the power system of the electric vehicle further comprises a relay 501 configured to select whether the isolation inductor L2 is connected into the circuit, as shown in FIG. 5. The battery heater 102 is connected in parallel with the electric distribution box 104. The fuse 401 is mounted in the battery group 101.

The isolation inductor L2 is disposed in the electric distribution box 104 so that the influence on the electric distribution box 104 by the battery heater 102 may be greatly reduced. Furthermore, when the battery heater 102 is operational, the isolation inductor L2 may be connected into the circuit by the relay 501, and when the battery heater 102 is not operational, the isolation inductor L2 may be disconnected from the circuit by the relay 501.

In one embodiment of the present disclosure, as shown in FIGS. 1-3, the power system of the electric vehicle further comprises a cooling assembly 110 configured to cool the first switch module 301 and the second switch module 302.

In one embodiment of the present disclosure, the cooling assembly 110 comprises: a wind channel arranged in the battery heater 102; and a fan arranged at one end of the wind channel. The fan is used to dissipate heat from the battery heater 102.

In another embodiment of the present disclosure, the cooling assembly 110 comprises: a coolant channel arranged in the battery heater 102; a coolant inlet and a coolant outlet arranged in the battery heater 102 respectively. The heat dissipation effect and the sealing performance of the battery heater may be improved by using the coolant to cool the battery heater.

Figure 6:
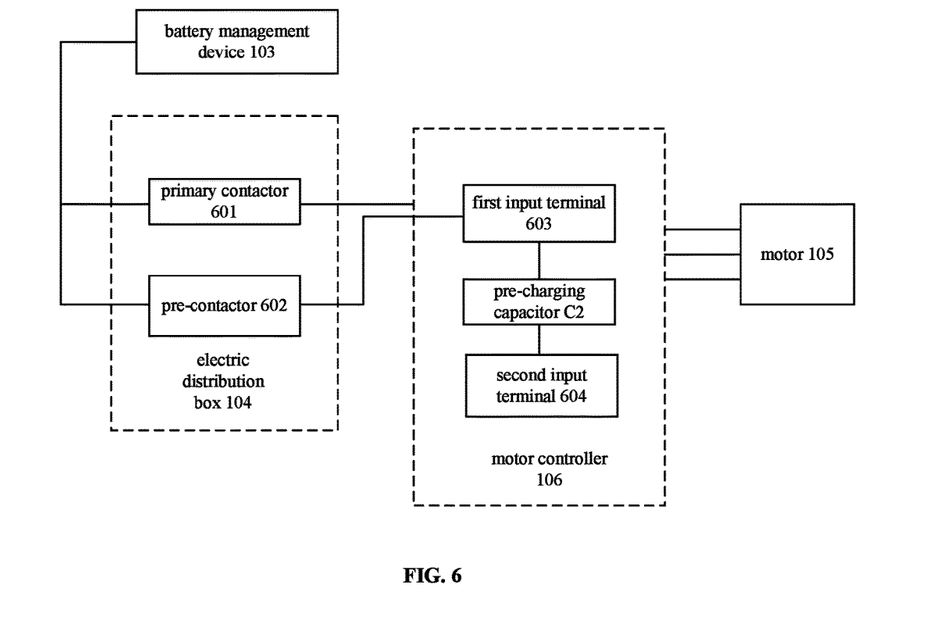
FIG. 6 illustrates a schematic diagram of an electric distribution box in a power system according to an exemplary embodiment.

Referring to FIG. 6, the electric distribution box 104 comprises: a primary contactor 601 and a pre-charging-contactor 602. The primary contactor 601 is configured to distribute the voltage output by the battery group 101 to power consumption equipment, such as the motor 105 of the electric vehicle. The pre-charging-contactor 602 is connected with the first input terminal 603 or the second input terminal 604 of the motor controller 106, and configured to charge the pre-charging capacitor C2 under the control of the battery management device 103 before the motor controller 106 controls the motor 105 to start.

In one embodiment of the present disclosure, the battery management device 103 is further configured to judge whether the current throttle depth change rate of the electric vehicle reaches a preset throttle depth change rate threshold, and to control the battery heater to stop heating the battery group when the current throttle depth change rate of the electric vehicle reaches the preset throttle depth change rate threshold. At this time, the battery group only supplies power to the power consumption equipment of the electric vehicle and driving of the electric vehicle. It should be understood that the throttle depth change rate is determined according to a change value of the throttle depth within a certain time. In other words, a driver determines whether the battery heater is controlled to heat the battery group according to the change of the throttle depth within a certain time.

In one embodiment of the present disclosure, if the current throttle depth change rate of the electric vehicle is lower than the preset throttle depth change rate threshold, for example, after the electric vehicle has finished running uphill or finished an urgent acceleration procedure, the battery management device controls the battery heater to continue heating the battery group; and if the electric vehicle has not finished running uphill or finished an urgent acceleration procedure, the battery management device controls the battery heater to stop heating the battery group, and the battery group only supplies power to the power consumption equipment of the electric vehicle and the driving of the electric vehicle.

With the power system of the electric vehicle according to embodiments of the present disclosure, by using a large current discharge of the battery group in the electric vehicle, the internal resistor of the battery itself may be heated so that the battery group may be heated. Without any external power supply, the electricity for heating is totally supplied by the battery group. A heating management may be performed for the battery group by the battery management device and the battery heater, which may greatly reduce the restriction on the use of the electric vehicle at the low temperature, thus satisfying the requirements of running and charging at the low temperature. Moreover, the power system heats the battery group directly, and therefore, a higher heating efficiency, a lower cost and a better utility may be obtained.

In one embodiment of the present disclosure, an electric vehicle is provided. The electric vehicle comprises the power system of the electric vehicle mentioned above. The electric vehicle may run in a low temperature environment, and the electric vehicle may run while the battery group may be heated simultaneously, thus ensuring a safe and smooth running.

Figure 7:
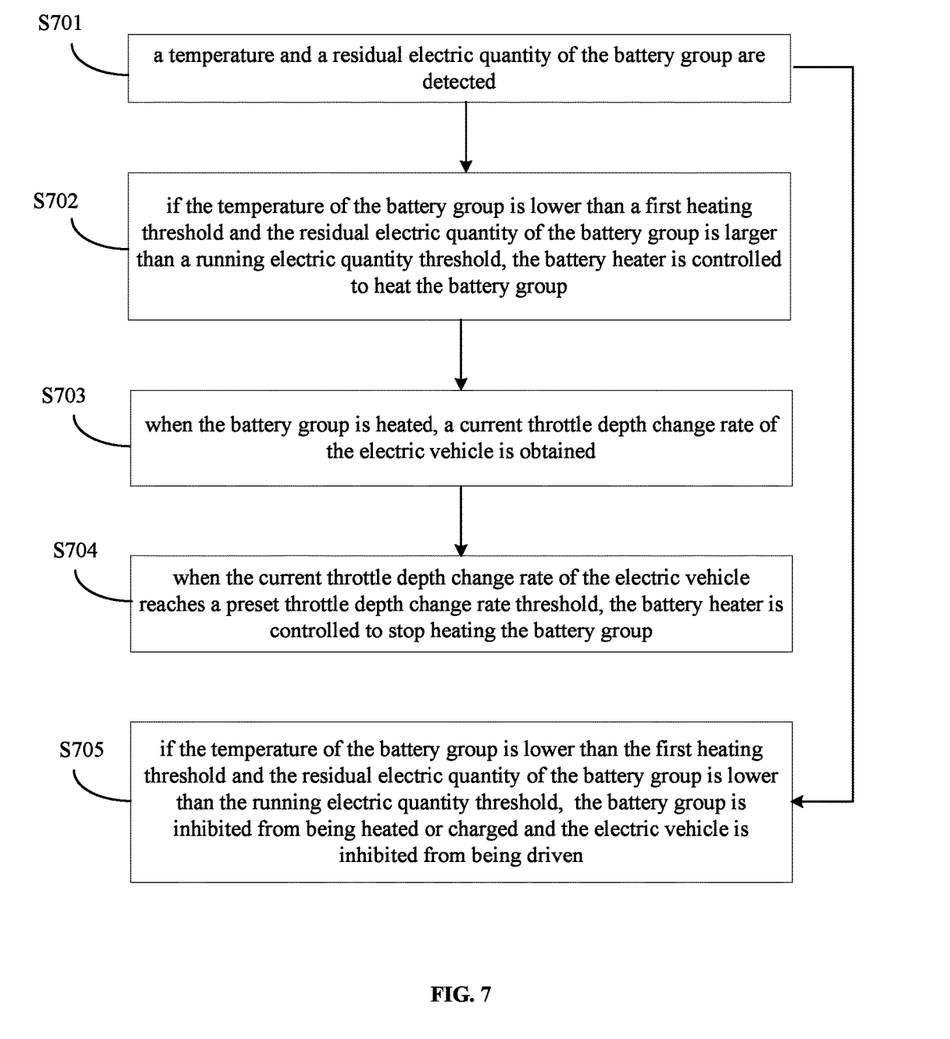
FIG. 7 illustrates a flow chart of a method for heating a battery group of an electric vehicle according to an exemplary embodiment.
Figure 8:
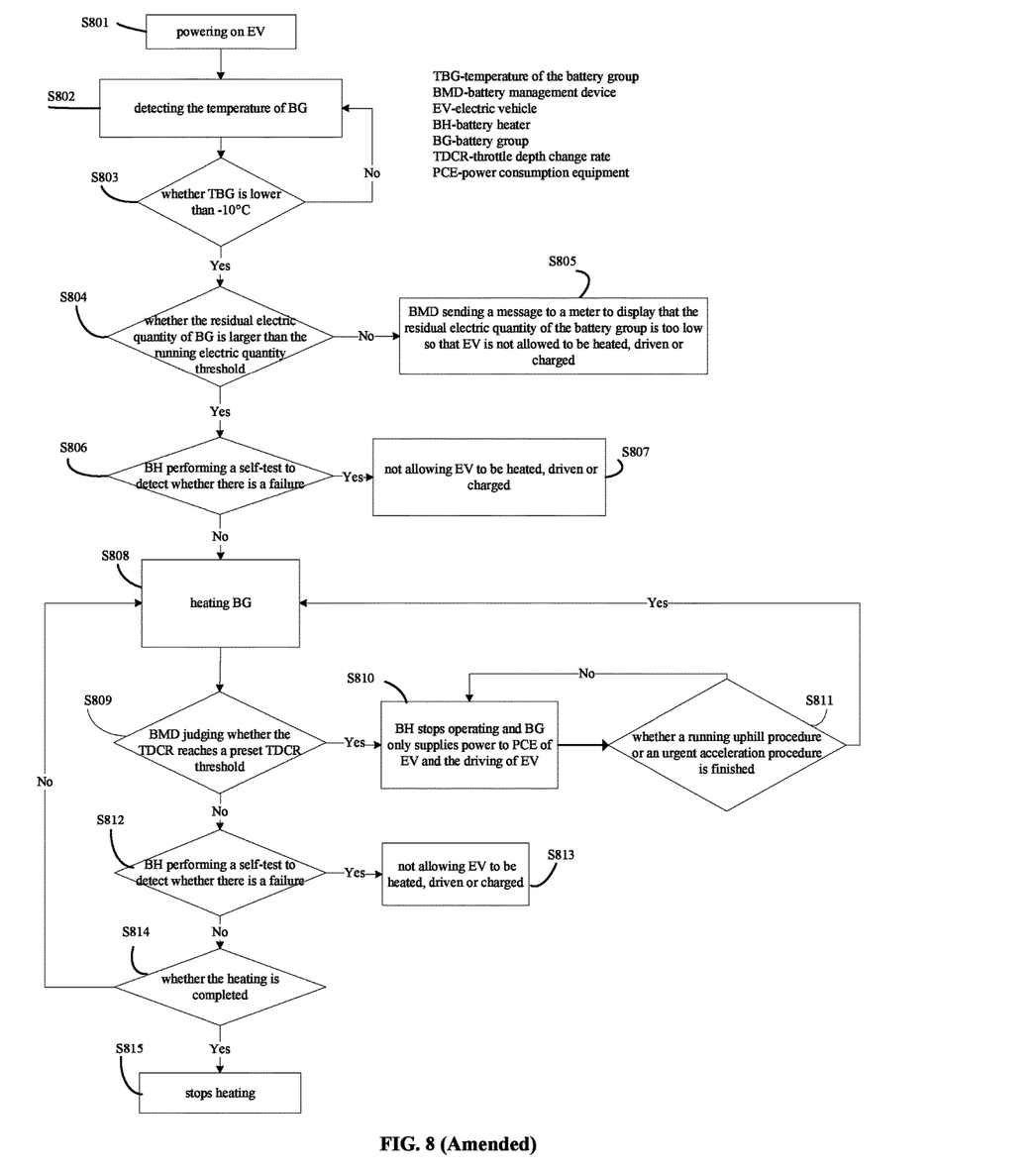
FIG. 8 illustrates a flow chart of a method for heating a battery group of an electric vehicle according to an exemplary embodiment.
Figure 9:
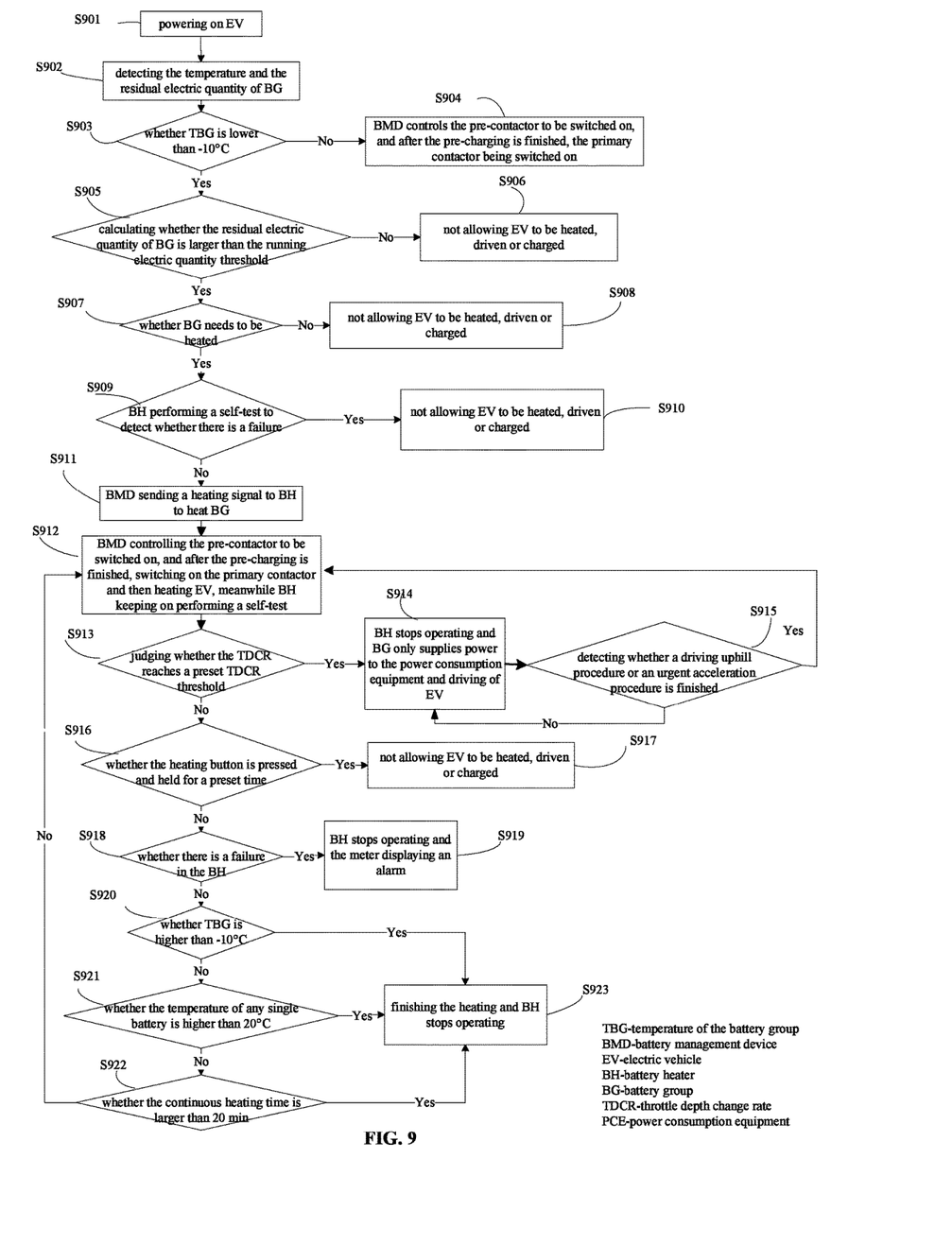
FIG. 9 illustrates a flow chart of a method for heating a battery group of an electric vehicle according to an exemplary embodiment.

In the following, a method for heating a battery group of an electric vehicle is described in detail with reference to FIGS. 7-9. In FIGS. 7-9, the detailed values (such as, −10° C.) are only illustrative to explain various thresholds (such as the first heating threshold), but not used to limit the scope of the present disclosure. The values of various thresholds may be changed according to actual conditions, which is obvious for a person skilled in the art. Furthermore, the executing orders of the steps in FIGS. 7-9 are only illustrative and exemplary, but not used to limit the scope of the present disclosure. The executing order of the steps may be changed according to actual conditions, which is also obvious for a person skilled in the art.

Referring to FIG. 7, a method for heating a battery group of an electric vehicle is provided. The method comprises the following steps.

At step S701, a temperature and a residual electric quantity of the battery group are detected.

At step S702, if the temperature of the battery group is lower than a first heating threshold and the residual electric quantity of the battery group is larger than a running electric quantity threshold, a battery heater is controlled to heat the battery group.

At step S703, when the battery group is heated, a current throttle depth change rate of the electric vehicle is obtained in real time.

At step S704, when the current throttle depth change rate reaches a preset throttle depth change rate threshold, the battery heater is controlled to stop heating the battery group.

At step S705, if the temperature of the battery group is lower than the first heating threshold and the residual electric quantity of the battery group is lower than the running electric quantity threshold, the battery group is inhibited from being heated or charged and the electric vehicle is inhibited from being driven.

According to an embodiment of the present disclosure, referring to FIG. 8, the method for heating the battery group of the electric vehicle may comprise the following steps.

At step S801, the electric vehicle is powered on.

At step S802, the temperature of the battery group is detected.

At step S803, it is judged whether the temperature of the battery group is lower than the first heating threshold (e.g., −10° C.). If no, the battery group does not need to be heated and return to step S802; if yes, the residual electric quantity of the battery group needs to be detected and then step S804 is followed.

At step S804, it is judged whether the residual electric quantity of the battery group is larger than the running electric quantity threshold. If yes, step S806 is followed; and if no, step S805 is followed.

At step S805, the battery management device sends a message to a meter to display that the residual electric quantity of the battery group is too low so that the electric vehicle is not allowed to be heated, driven or charged.

At step S806, the battery heater performs a self-test to detect whether there is a failure, if yes, step S807 is followed; and if no, step S808 is followed.

At step S807, the electric vehicle is not allowed to be heated, driven or charged.

At step S808, the battery heater heats the battery group, and during the heating process, step S812 is performed simultaneously.

At step S809, the battery management device judges whether the current throttle depth change rate of the electric vehicle reaches the preset throttle depth change rate threshold according to the throttle depth message. If yes, step S810 is followed; and if no, step S812 is followed.

At step S810, the battery heater stops working and the battery group only supplies power to the power consumption equipment of the electric vehicle and the driving of the electric vehicle.

At step S811, it is judged whether a running uphill procedure or an urgent acceleration procedure is finished, if yes, step S808 is followed, and if no, step S810 is followed. In other words, if the current throttle depth change rate of the electric vehicle is lower than the preset throttle depth change rate threshold, for example, if the running uphill procedure or the urgent acceleration procedure is finished, the battery management device controls the battery heater to continue heating the battery group.

At step S812, the battery heater performs a self-test to detect whether there is a failure, if yes, step S813 is followed; and if no, step S814 is followed.

At step S813, the electric vehicle is not allowed to be heated, driven or charged.

At step S814, it is judged whether the heating is completed. If yes, step S815 is followed; and if no, step S808 is followed.

At step S815, a CAN message is sent to the battery heater to control the battery heater to stop heating the battery group.

In one embodiment of the present disclosure, referring to FIG. 8, the first heating temperature threshold may be −10° C., and the running electric quantity threshold may be 30% of the total electric quantity of the battery group.

According to another embodiment of the present disclosure, referring to FIG. 9, the method for heating the battery group of the electric vehicle may comprise the following steps.

At step S901, the electric vehicle is powered on.

At step S902, a temperature and a residual electric quantity of the battery group are detected.

At step S903, it is judged whether the temperature of the battery group is lower than the first heating threshold. If yes, step S905 is followed; and if no, step S904 is followed.

At step S904, the battery management device controls the pre-charging-contactor to be switched on, and after the pre-charging is finished, the primary contactor is switched on. The electric vehicle runs normally. Specifically, the battery management device controls the pre-charging-contactor in the electric distribution box to be switched on to charge the pre-charging capacitor and controls the pre-charging-contactor to be switched off after the pre-charging is finished.

At step S905, it is judged whether the residual electric quantity of the battery group is larger than the running electric quantity threshold. If yes, step S907 is followed; and if no, step S906 is followed.

At step S906, the battery management device sends a message to a meter to display that the residual electric quantity of the battery group is too low so that the electric vehicle is not allowed to be heated, driven or charged (e.g., the battery group is not heated or charged).

At step S907, a user confirms whether the battery group needs to be heated. If yes, step S909 is followed; and if no, step S908 is followed.

At step S908, the battery management device sends a message to the meter to display that the electric vehicle is not allowed to be heated, driven or charged.

At step S909, the battery heater performs a self-test to detect whether there is a failure, if yes, step S910 is followed; and if no, step S911 is followed.

At step S910, the battery management device stops supplying power and sending a message to the battery heater, and sends a message to the meter to display that there is a failure in the battery heater so that the electric vehicle is not allowed to be heated, driven or charged.

At step S911, the battery management device sends a heating signal to the battery heater to heat the battery group.

At step S912, the battery management device controls the pre-charging-contactor to be switched on, and after the pre-charging is finished, the primary contactor is switched on and then the battery group is heated, while the battery heater keeps on performing a self-test. Specifically, the battery management device calculates the current temperature and the current residual electric quantity of the battery group, calculates the maximum output power of the battery group according to the current temperature and the current residual electric quantity of the battery group, and controls the electric vehicle to run under a limited power according to the maximum output power.

At step S913, the battery management device judges whether the throttle depth change rate reaches the preset throttle depth change rate threshold according to the throttle depth message, if yes, step S914 is followed, and if no, step S916 is followed.

At step S914, the battery heater stops working and the battery group only supplies power to the power consumption equipment of the electric vehicle and the driving of the electric vehicle.

At step S915, it is judged whether a running uphill procedure or an urgent acceleration procedure is finished, if yes, step S912 is followed, and if no, step S914 is followed.

At step S916, it is judged whether a heating button is pressed and held for a preset time. If yes, step S917 is followed, and if no, step S918 is followed. In one embodiment, the preset time may be 2 seconds.

At step S917, the battery management device sends a message to the meter to prompt that the user stops heating so that the electric vehicle is not allowed to be heated, driven or charged.

At step S918, it is detected whether there is a failure in the battery heater. If yes, step S919 is followed, and if no, step S920 is followed.

At step S919, the battery heater stops working and the meter displays an alarm so that the electric vehicle is not allowed to be heated, driven or charged.

At step S920, it is detected whether the temperature of the battery group is higher than the first heating threshold. If yes, step S923 is followed, and if no, step S921 is followed.

At step S921, it is detected whether the temperature of any single battery in the battery group is higher than the second heating threshold. If yes, step S923 is followed, and if no, step S922 is followed.

At step S922, it is detected whether the continuous heating time is larger than the heating time threshold. If yes, step S923 is followed, and if no, step S912 is followed.

At step S923, the heating is finished and the battery heater stops operating.

In one embodiment of the present disclosure, the first heating threshold may be $-10°$ C., the second heating threshold may be $20°$ C., and the heating time threshold may be 20 minutes.

In some embodiments, when the electric vehicle is powered on, the battery management device detects the temperature of the battery group and the status of the primary contactor. The temperature of the battery group is an average of temperatures of all single batteries in the battery group. The battery management device samples the temperature of each single battery in the battery group through an information collector and calculates the temperature of the battery group. If the temperature of the battery group is lower than the first heating temperature and the residual electric quantity of the battery group is larger than the parking electric quantity threshold, the user presses and holds the heating button for 2 seconds, and then the battery management device sends a message to the battery heater through the CAN cable to allow the battery group to be heated. Before heating the battery group in the running heating mode, that is, before the motor works, the battery management device sends the control signal to the electric distribution box to control the pre-charging-contactor to be switched on so that the battery group charges the pre-charging capacitor C2. When the voltage of the pre-charging capacitor C2 is substantially equal to that of the battery group, the motor is allowed to work.

In one embodiment of the present disclosure, the heating button is disposed on the meter. Provided that the temperature of the battery group is lower than the first heating threshold and the residual electric quantity of the battery group is larger than the parking electric quantity threshold, when the heating button is pressed, the battery heater is allowed to work. If the heating button is pressed again and held for 2 seconds, the battery heater is forced to stop working.

The primary contactor is disposed in the electric distribution box and configured to connect the motor controller to a power supply or disconnect the motor controller from a power supply. When the residual electric quantity of the battery group is larger than the running electric quantity threshold, the battery management device sends the control signal to the electric distribution box to control the primary contactor to be switched on so that the motor is allowed to work. The motor controller converts the DC to the three-phase AC required by the motor through the driving circuit, to supply power to the motor and to allow the electric vehicle to run under a limited power.

The pre-charging-contactor is also disposed in the electric distribution box and connected to the pre-charging capacitor C2 in series. In particular, the pre-charging capacitor C2 is charged before the motor works. The reasons may be as follows. In one aspect, an electrical current shock may be avoided in the pre-charging procedure and an agglomeration caused when the primary contactor is switched on may be avoided. A current limiting resistor is connected in series between the pre-charging capacitor and the pre-charging-contactor. When the pre-charging is finished, the battery management device controls the primary contactor to be switched on and then controls the pre-charging-contactor to be switched off. In another aspect, since the current is larger at the start moment of the motor, the voltage of the whole battery group is reduced. Therefore, the pre-charging capacitor C2 is charged firstly until the voltage thereof is substantially equal to that of the battery group, and then the motor is started. Because the voltage of the pre-charging capacitor cannot change suddenly, by connecting the pre-charging capacitor and the motor in parallel, the impact on the voltage of the battery group resulting from the start of the motor may be decreased.

When the battery heater receives the heating signal sent by the battery management device, the battery heater performs a self-test to detect whether there is a failure in the battery heater. In one embodiment of the present disclosure, the battery heater sends a single pulse of 0.5 ms to detect whether there is a failure in the battery heater. If there is not any failure, the battery heater sends a control pulse (for example with a cycle of 20 ms and a duty ratio of 20%) to the internal switch module to make the battery group short the circuit in a short time. So the heating purpose is achieved. Meanwhile, the battery heater sends a CAN signal to the meter. The meter receives the CAN signal and displays that "the battery group is being heated".

When the battery group is heated, the battery management device and the battery heater keep on detecting the status of the battery group. If the temperature of the battery group is higher than the first heating threshold, or the continuous heating time is larger than the heating time threshold, or the maximum temperature of a single battery in the battery group is higher than the second heating threshold, the battery heater stops sending the control pulse to the internal switch module to stop heating the battery group. The battery heater sends a CAN signal to the meter. The meter receives the CAN signal and displays that "the heating is finished". The heating procedure is finished. In one embodiment of the present disclosure, the second heating threshold may be 20° C., and the heating time threshold may be 20 minutes. Preferably, in order to avoid a repeated start of the heating procedure, during the heating process, if the temperature of the battery group is detected to be higher than the first heating threshold by 5° C., the battery group is stopped from being heated.

If the temperature of the battery group is higher than the first heating threshold, the battery management device works normally. If the temperature of the battery group is lower than the first heating threshold and the residual electric quantity of the battery group is lower than the parking electric quantity threshold, the primary contactor is not switched on and the battery management device sends the CAN signal to the battery heater and the meter, so that the battery group is not allowed to be heated. When the meter receives the CAN signal, the meter displays that "the residual electric quantity of the battery group is not enough" so that the electric vehicle is not allowed to be heated, driven or charged.

If a failure of the battery heater, including under voltage protection, over-voltage protection, overheat protection, pulse width interval protection or maximum turn-on time protection, appears during the self-test process, it is not allowed to heat the battery group. The battery heater sends a failure signal. The meter receives the failure signal and displays that there is "a failure in the battery heater". The heating is not allowed.

If any failure of the battery heater, including under voltage protection, over-voltage protection, overheat protection, pulse width interval protection or maximum turn-on time protection, appears during the heating process, the battery heater stops heating the battery group and sends a failure signal. The meter receives the failure signal and displays that "a failure in the battery heater". The heating is ceased.

In some embodiments of the present disclosure, the battery heater comprises a protection circuit to prevent the failures mentioned above. The protection circuit is described in detail as follows.

(1) When there is a failure signal, an IGBT in the battery heater is turned off. An ERROR (failure) pin of the protection circuit is set at a low level, and a failure signal is outputted through an optical coupler. Thus, an ERROUT (failure output) pin is at the low level. To release the protection status, the PWM (pulse width modulation) wave should be maintained at a high level for 2 seconds, and then the failure signal is reset and the protection circuit is recovered to a normal status. If the failure signal can not be reset by the PWM wave in 2 seconds, a permanent error occurs in the protection circuit so that the protection circuit can not work normally.

(2) To ensure a normal work of a discharge module of the IGBT, the frequency of the pulse sent by a DSP (digital signal processor) may not be too high and the pulse width may not be too long. For example, the maximum pulse width may be 5 ms and the minimum interval may be 7-10 ms, or else a failure signal may be outputted.

(3) In one embodiment of the present disclosure, a DC-DC isolation power supply is used to drive the IGBT. The positive bias voltage for the gate terminal of the IGBT may be +15V, and the negative bias voltage for the gate terminal of the IGBT may be −7V. The negative bias voltage for the gate terminal of IGBT may turn off the IGBT quickly and avoid a malfunction of turning on IGBT because of the overlarge surge current.

(4) In one embodiment of the present disclosure, the protection circuit comprises an under voltage protection circuit. The under voltage protection circuit may avoid an increase of the power consumption of the IGBT caused by the deficient driving voltage. When the driving voltage decreases to a first voltage threshold, the under voltage protection circuit starts to work. In one embodiment of the present disclosure, the first voltage threshold may be 9V.

(5) The over-heat protection circuit may avoid the damage to the IGBT caused by the high temperature. The protection circuit samples the temperature by using a thermistor. When the temperature of the IGBT is higher than a safe temperature threshold, the over-heat protection circuit starts to work. The protection circuit may also be configured to detect whether there is an open circuit in the thermistor. When there is an open circuit in the thermistor, the equivalent impedance is infinite and a protection signal is outputted. In one embodiment of the present disclosure, the safe temperature threshold may be 85° C.

(6) Because there is a large inductance in the discharge loop, when the IGBT is turned off, an over-high voltage may be excited by the collector terminal of the IGBT. So a high voltage capacitor is connected in parallel between the collector terminal and the emitter terminal of the IGBT. The over-voltage protection circuit may avoid the over high voltage of the collector terminal to damage the IGBT at the moment of turning off the IGBT. When the voltage of the collector terminal is larger than a second voltage threshold, a protection signal is outputted. In one embodiment of the present disclosure, the second voltage threshold may be 800V.

During the heating process of the battery group, if the user suddenly presses and holds the heating button for 2 seconds, the battery heater stops heating the battery group so that the battery group is not allowed to be charged and the electric vehicle is not allowed to be driven.

With the method for heating the battery of the power system of the electric vehicle according to embodiments of the present disclosure, the battery group of the electric vehicle may be heated without any external power supply. The battery group is heated to a required temperature and then may be charged or discharged normally. So the restriction on the use of the electric vehicle at the low temperature may be greatly reduced and the requirements of running and charging at the low temperature may be satisfied. Furthermore, by sampling the throttle depth change rate of the electric vehicle and judging whether the output power of the battery group is too large, it is possible to stop heating the battery group when the output power of the battery group is too large, and thus to avoid the over discharging of the battery group. Therefore, a service life of the battery group is prolonged and the dynamic property of the electric vehicle is ensured.

In the preceding specification, the subject matter has been described with reference to specific exemplary embodiments. It will, however, be evident that various modifications and changes may be made without departing from the spirit and scope of the claimed subject matter as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed is:

1. A power system of an electric vehicle, comprising:
   a battery group;
   a battery heater, connected with the battery group and configured to charge and discharge the battery group to heat the battery group;
   a battery management device, connected with the battery group and the battery heater respectively, configured to calculate a residual electric quantity of the battery group, to judge whether the residual electric quantity of the battery group is larger than a running electric quantity threshold, to control the battery heater to heat the battery group when a temperature of the battery group is lower than a first heating threshold and the residual electric quantity of the battery group is larger than the running electric quantity threshold, to obtain a current throttle depth change rate of the electric vehicle in real time, and to control the battery heater to stop heating the battery group when the current throttle depth change rate reaches a preset throttle depth change rate threshold;
   an electric distribution box, configured to distribute a voltage output by the battery group;
   a motor;
   a motor controller, connected with the motor and the electric distribution box respectively, comprising a first input terminal, a second input terminal and a pre-charging capacitor connected between the first input terminal and the second input terminal, and configured to supply power to the motor according to a control command and a voltage distributed by the electric distribution box;
   an isolation inductor, having a first end connected to the electric distribution box and a second end connected to a relay, wherein an inductance of the isolation inductor matches with a capacitance of the pre-charging capacitor and the isolation inductor is configured to absorb a reversed voltage of the battery group; and
   the relay is configured between the isolation inductor and the battery heater, wherein when the battery heater is operational, the isolation inductor is connected to the battery heater by the relay, and when the battery heater is nonoperational, the isolation inductor is disconnected from the battery heater by the relay.

2. The power system of claim 1, wherein the inductance L of the isolation inductor is determined by a formula:
   $T=2\pi\sqrt{LC}$, where T is an equivalent load operational period of the motor and C is the capacitance of the pre-charging capacitor.

3. The power system of claim 1, wherein the battery heater is further configured to perform a failure self-test and to send a test result to the battery management device.

4. The power system of claim 1, wherein the battery heater comprises:
   a first switch module, wherein a first terminal of the first switch module is connected with a first electrode of the battery group and the isolation inductor respectively;
   a first capacitor, wherein a first terminal of the first capacitor is connected with a second terminal of the first switch module, and a second terminal of the first capacitor connected with a second electrode of the battery group;
   a first inductor, wherein a first terminal of the first inductor is connected with a node between the first switch module and the first capacitor; and
   a second switch module, wherein a first terminal of the second switch module is connected with a second terminal of the first inductor, and a second terminal of the second switch module is connected with the second electrode of the battery group, wherein:
      a control terminal of the first switch module and a control terminal of the second switch module are connected with the battery management device; and
      the battery management device sends a heating signal to the control terminal of the first switch module and the control terminal of the second switch module to control the first switch module and the second switch module to turn on in turn so as to generate a charge current and a discharge current in turn, in which the first switch module is on when the second switch module is off, and the first switch module is off when the second switch module is on.

5. The power system of claim 4, wherein the battery heater further comprises a cooling assembly configured to cool the first switch module and the second switch module.

6. The power system of claim 5, wherein the cooling assembly comprises:
   a wind channel arranged in the battery heater; and
   a fan arranged at one end of the wind channel.

7. The power system of claim 5, wherein the cooling assembly comprises:
   a coolant channel arranged in the battery heater; and
   a coolant inlet and a coolant outlet arranged in the battery heater.

8. The power system of claim 1, wherein the battery heater further comprises a power connector configured to connect and fasten a power cable connected to the battery group.

9. The power system of claim 1, wherein the battery management device is further configured to control the battery heater to continue heating the battery group when the current throttle depth change rate is lower than the preset throttle depth change rate threshold.

10. The power system of claim 1, wherein the electric distribution box comprises:
    a primary contactor, configured to distribute the voltage output by the battery group to power consumption equipment of the electric vehicle; and
    a pre-charging-contactor, connected with the first input terminal or the second input terminal of the motor controller, and configured to charge the pre-charging capacitor under control of the battery management device before the motor controller controls the motor to start.

11. An electric vehicle, comprising:
    a power system of the electric vehicle, comprising:
       a battery group;

a battery heater, connected with the battery group and configured to charge and discharge the battery group to heat the battery group;

a battery management device, connected with the battery group and the battery heater respectively, configured to calculate a residual electric quantity of the battery group, to judge whether the residual electric quantity of the battery group is larger than a running electric quantity threshold, to control the battery heater to heat the battery group when a temperature of the battery group is lower than a first heating threshold and a residual electric quantity of the battery group is larger than a running electric quantity threshold, to obtain a current throttle depth change rate of the electric vehicle in real time, and to control the battery heater to stop heating the battery group when the current throttle depth change rate reaches a preset throttle depth change rate threshold;

an electric distribution box, configured to distribute a voltage output by the battery group;

a motor;

a motor controller, connected with the motor and the electric distribution box respectively, comprising a first input terminal, a second input terminal and a pre-charging capacitor connected between the first input terminal and the second input terminal, and configured to supply power to the motor according to a control command and a voltage distributed by the electric distribution box;

an isolation inductor, having a first end connected to the electric distribution box and a second end connected to a relay, wherein an inductance of the isolation inductor matches with a capacitance of the pre-charging capacitor and the isolation inductor is configured to absorbed a reversed voltage of the battery group; and the relay is configured between the isolation inductor and the battery heater, wherein when the battery heater is operational, the isolation inductor is connected to the battery heater by the relay, and when the battery heater is nonoperational, the isolation inductor is disconnected from the battery heater by the relay.

12. The electric vehicle of claim 11, wherein the battery heater comprises:

a first switch module, wherein a first terminal of the first switch module is connected with a first electrode of the battery group and the isolation inductor respectively;

a first capacitor, wherein a first terminal of the first capacitor is connected with a second terminal of the first switch module, and a second terminal of the first capacitor is connected with a second electrode of the battery group;

a first inductor, wherein a first terminal of the first inductor is connected with a node between the first switch module and the first capacitor; and a second switch module, wherein a first terminal of the second switch module is connected with a second terminal of the first inductor, and a second terminal of the second switch module is connected with the second electrode of the battery group, wherein:

a control terminal of the first switch module and a control terminal of the second switch module are connected with the battery management device; and the battery management device sends a heating signal to the control terminal of the first switch module and the control terminal of the second switch module to control the first switch module and the second switch module to turn on in turn so as to generate a charge current and a discharge current in turn, in which the first switch module is on when the second switch module is off, and the first switch module is off when the second switch module is on.

13. The electric vehicle of claim 11, wherein the battery management device is further configured to control the battery heater to continue heating the battery group when the current throttle depth change rate is lower than the preset throttle depth change rate threshold.

14. The electric vehicle of claim 11, wherein the electric distribution box comprises:

a primary contactor, configured to distribute the voltage output by the battery group to power consumption equipment of the electric vehicle; and a pre-charging-contactor, connected with the first input terminal or the second input terminal of the motor controller, and configured to charge the pre-charging capacitor under control of the battery management device before the motor controller controls the motor to start.

15. The power system of claim 1, wherein the battery management device is connected with the battery heater via a controller area network (CAN) cable, and the battery management device is connected with the battery group via a sampling cable.

16. The electric vehicle of claim 11, wherein the battery management device is connected with the battery heater via a controller area network (CAN) cable, and the battery management device is connected with the battery group via a sampling cable.

17. The power system of claim 1, wherein the relay comprises a first terminal, a second terminal and a third terminal, the first terminal of the relay is connected to the second end of the isolation inductor, the second terminal of the relay is connected to the electric distribution box, and the third terminal of the relay is connected to the battery heater.

18. The electric vehicle of claim 11, wherein the relay comprises a first terminal, a second terminal and a third terminal, the first terminal of the relay is connected to the second end of the isolation inductor, the second terminal of the relay is connected to the electric distribution box, and the third terminal of the relay is connected to the battery heater.

* * * * *